(12) United States Patent
Stewart, II

(10) Patent No.: US 9,380,255 B2
(45) Date of Patent: Jun. 28, 2016

(54) ENTERTAINMENT SYSTEM FOR A MOTORCYCLE

(71) Applicant: Samuel Stewart, II, Lake Wales, FL (US)

(72) Inventor: Samuel Stewart, II, Lake Wales, FL (US)

(*) Notice: Subject to any disclaimer, the term of this patent is extended or adjusted under 35 U.S.C. 154(b) by 0 days.

(21) Appl. No.: 14/538,843

(22) Filed: Nov. 12, 2014

(65) Prior Publication Data

US 2016/0134830 A1    May 12, 2016

(51) Int. Cl.
| | |
|---|---|
| *H04N 5/76* | (2006.01) |
| *H04N 5/765* | (2006.01) |
| *B60R 1/00* | (2006.01) |
| *H04N 9/87* | (2006.01) |

(52) U.S. Cl.
CPC ............... *H04N 5/765* (2013.01); *B60R 1/001* (2013.01); *H04N 9/87* (2013.01); *B60R 2300/10* (2013.01); *B60R 2300/20* (2013.01); *B60R 2300/308* (2013.01)

(58) Field of Classification Search
CPC .. B60R 1/10; B60R 2300/302; B60R 230/70; B60R 2300/8066
See application file for complete search history.

(56) References Cited

U.S. PATENT DOCUMENTS

| | | | | |
|---|---|---|---|---|
| 5,898,392 | A * | 4/1999 | Bambini | B60R 1/12 340/996 |
| 2004/0143373 | A1* | 7/2004 | Ennis | B60R 1/00 701/1 |
| 2012/0162891 | A1* | 6/2012 | Tranchina | B60R 11/0252 361/679.26 |
| 2013/0113348 | A1* | 5/2013 | Holben | H05K 5/03 312/223.1 |
| 2013/0229519 | A1* | 9/2013 | Kavuru | B60R 11/04 348/148 |

* cited by examiner

*Primary Examiner* — Huy T Nguyen
(74) *Attorney, Agent, or Firm* — Lonnie R Drayer

(57) ABSTRACT

An entertainment system for a motorcycle includes a windscreen provided with at least one speaker, a camera and a video display screen. Conductors connect the speaker, camera and video display screen to a controller for conducting power and control signals between the controller and the speaker, camera and video display screen. The controller is in circuit communication with conductors for receiving power from an electrical system of a motorcycle. Control switches send control signals to the controller via conductors. Images presented on the video display screen are visible only from a side of the windscreen that faces away from an operator of a motorcycle when the motorcycle is moving forward.

8 Claims, 6 Drawing Sheets

ENTERTAINMENT SYSTEM FOR A MOTORCYCLE

FIELD OF THE INVENTION

The present invention relates to an entertainment system for a motorcycle.

BACKGROUND OF THE INVENTION

An operator of a motorcycle may have times when he or she is not travelling when there is a desire to be entertained by other than human company. One form of entertainment that would be desirable is to view in a leisurely manner the terrain that has been traversed without the stress of concentrating on the job of controlling the operation of the motorcycle. Alternatively the motorcycle operator may wish to view a recording of a movie or other entertaining or informative show. While a hand held device such as a smart phone can provide some of these functions, the preservation of the memories of what may be missed by the operator while concentrating on safely operating the motorcycle could be better met using an entertainment system that is mounted directly to the motorcycle. Such a system is provided by the entertainment system for a motorcycle of the present invention.

DISCUSSION OF THE PRIOR ART

Until now the only entertainment systems available for mounting to a motorcycle have been audio systems including radio receivers and devices for playing recorded music.

SUMMARY OF THE INVENTION

There is provided in accordance with the present invention an entertainment system that may be assembled with a motorcycle to provide a camera for creating and recording moving or still images of what a motorcycle operator could see while driving the motorcycle on or off the road. While sounds may be recorded it is recognized that the sounds of the motor and rushing wind will make the recording of sounds while operating a motorcycle makes recording of voices difficult. The entertainment system includes a camera associated with a windscreen, conductors for conducting data gathered by the camera to a control module, controllers used by the operator for sending control signals to the control module, and conductors for conducting signals from the control module to a display screen associated with the windscreen.

DETAILED DESCRIPTION OF THE INVENTION

Figure 1:
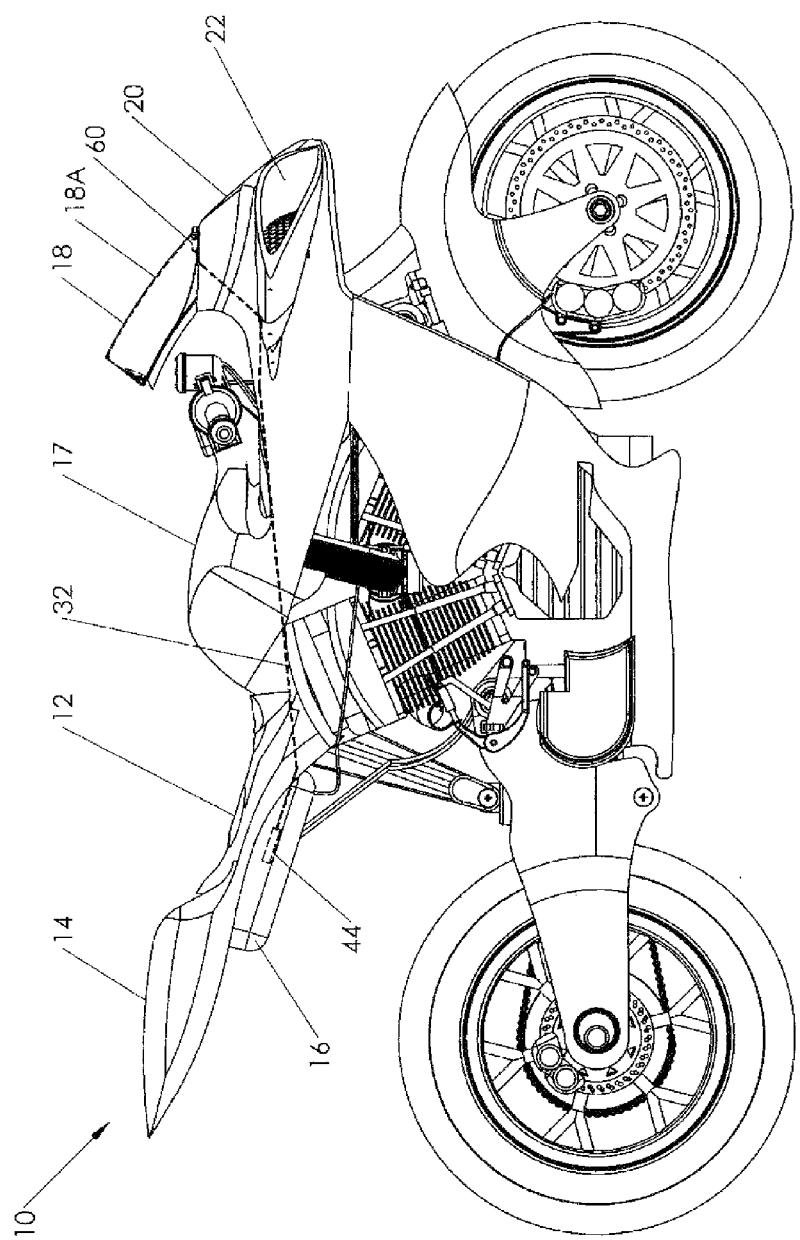
FIG. 1 is a side elevation view of an exemplary motorcycle equipped with an entertainment system of the present invention.
Figure 2:
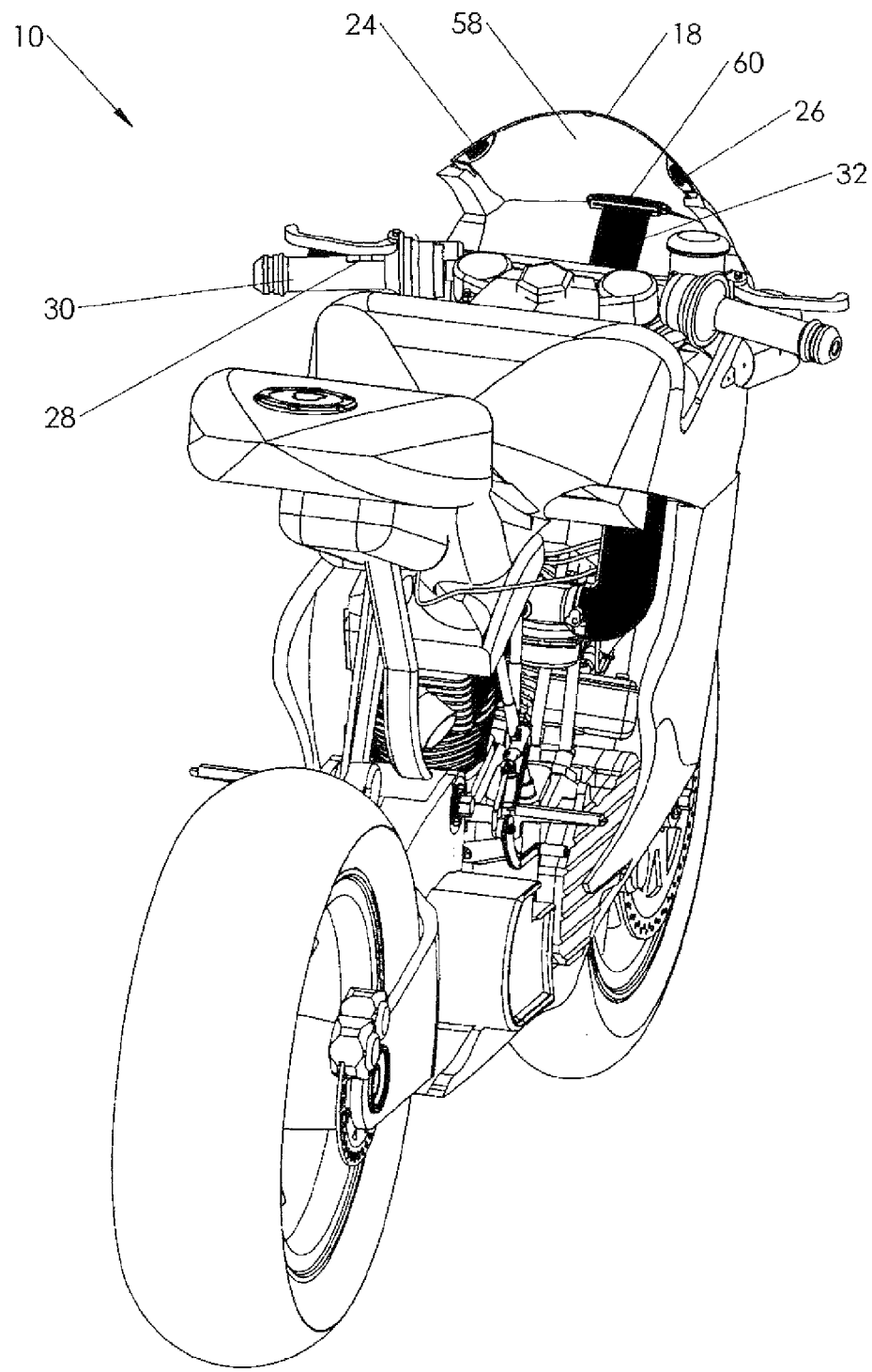
FIG. 2 is a perspective view of the exemplary motorcycle of FIG. 1 equipped with the entertainment system of the present invention.
Figure 3:
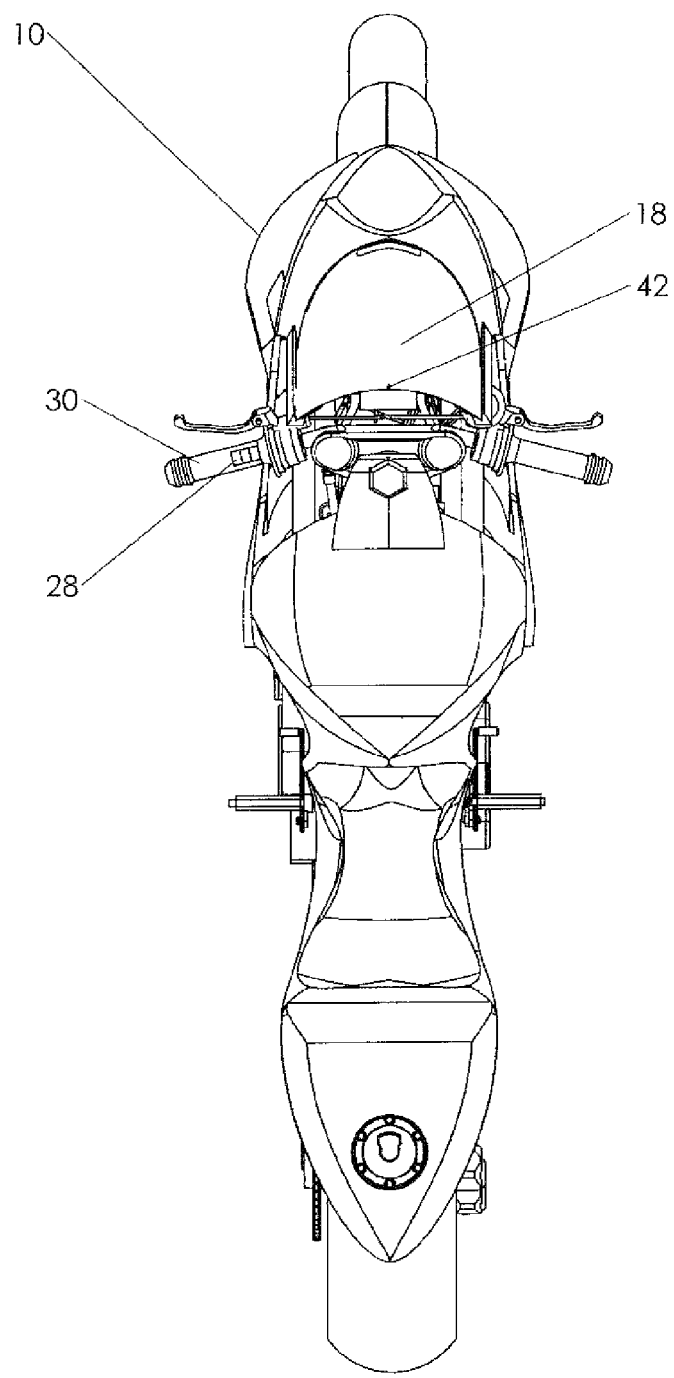
FIG. 3 is a top view looking down on the exemplary motorcycle of FIGS. 1 and 2 equipped with the entertainment system of the present invention.

Referring first to FIGS. 1-3 there is shown a side elevation view, a perspective view, and a top view of an exemplary motorcycle 10 equipped with an entertainment system of the present invention. It is understood that while the exemplary motorcycle shown in the drawing figures is a sportster type of motorcycle that the entertainment system of the present invention may be installed on any suitable type or make of motorcycle. The exemplary motorcycle 10 is equipped with a seat 12 for the operator of the motorcycle, and with a passenger seat 14 located rearward of the operator's seat. A compartment 16 located below the operator's seat 12 and passenger's seat 14 contains a control module 44 for an entertainment system for the motorcycle.

Figure 4:
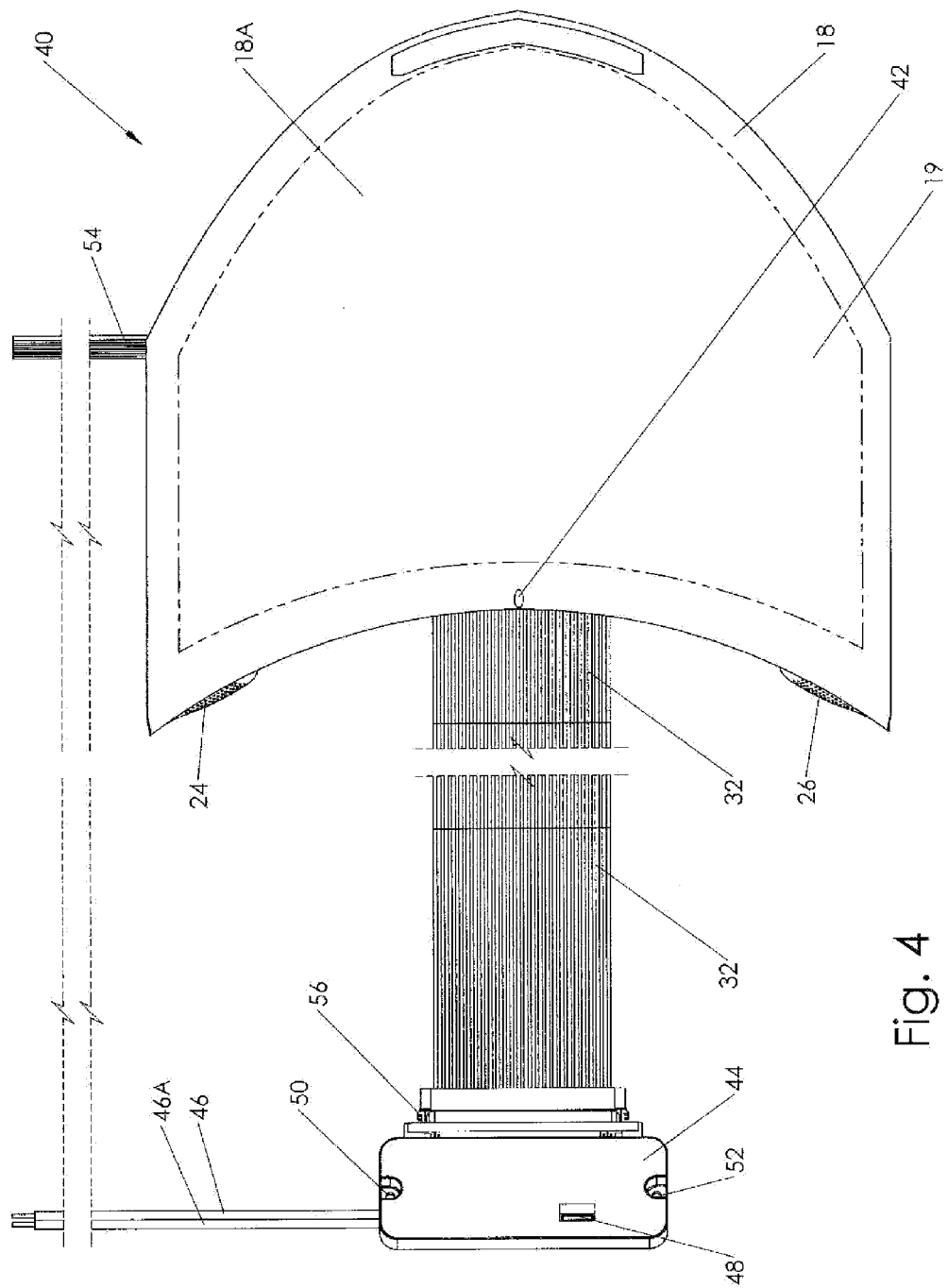
FIG. 4 is a top schematic view looking down at the entertainment system for a motorcycle of the present invention.

A windscreen 18 is located forward of the operator's seat 12 and is fixed to a front cowling 20 which in turn is fixed to the structure of the motorcycle 10. The front cowling 10 is equipped with a headlight 22. An entertainment system 40 is associated with the windscreen. Audio speakers 24, 26 are fixed to the windscreen with conductors 24A, 26A extending between the speakers and a conductive wire tape 32 as shown in a schematic in FIG. 5. The speakers may have functionality both for audio portions of recorded programming and as part of a Bluetooth system allowing the motorcycle operator to communicate more safely by cell phone. A video camera 42 is fixed to the windscreen with a conductor 42A extending between the camera and the conductive wire tape 32 as shown in a schematic in FIG. 5. A connector box 60 is provides a serial port for joining the conductors 24A, 26A, and 42A to the conductive wire tape 32 that provides a number of parallel conductors held in relation to one another by a suitable matrix. The windscreen is provided with a video display screen 19, such as an LED screen or plasma screen, indicated by dashed lines in FIG. 4, for presenting visual images viewable only on the front side 18A of the windscreen. That is to say images presented on the video display screen being visible only from a side of the windscreen that faces away from an operator of the motorcycle when the motorcycle is moving forward. This feature of the invention prevents the motorcycle operator from being distracted by a video image on the video display screen while the motorcycle operator is driving forward down a street or highway. However, the motorcycle operator can view an image on the video display screen when the motorcycle is parked. The controller has circuitry for recording video images obtained by the camera and sending the recorded video images to the display screen. Thus the motorcycle operator can enjoy seeing the landscape, architecture, people, wildlife and so forth that he could not safely focus on while driving down a road or highway thanks to an image and sound recording hardware and software in the controller 44. Preferably the video display screen is protected from damage by a suitable screen protector. Video signals are conducted to the video display screen via conductors that are part of the wire tape 32.

Figure 5:
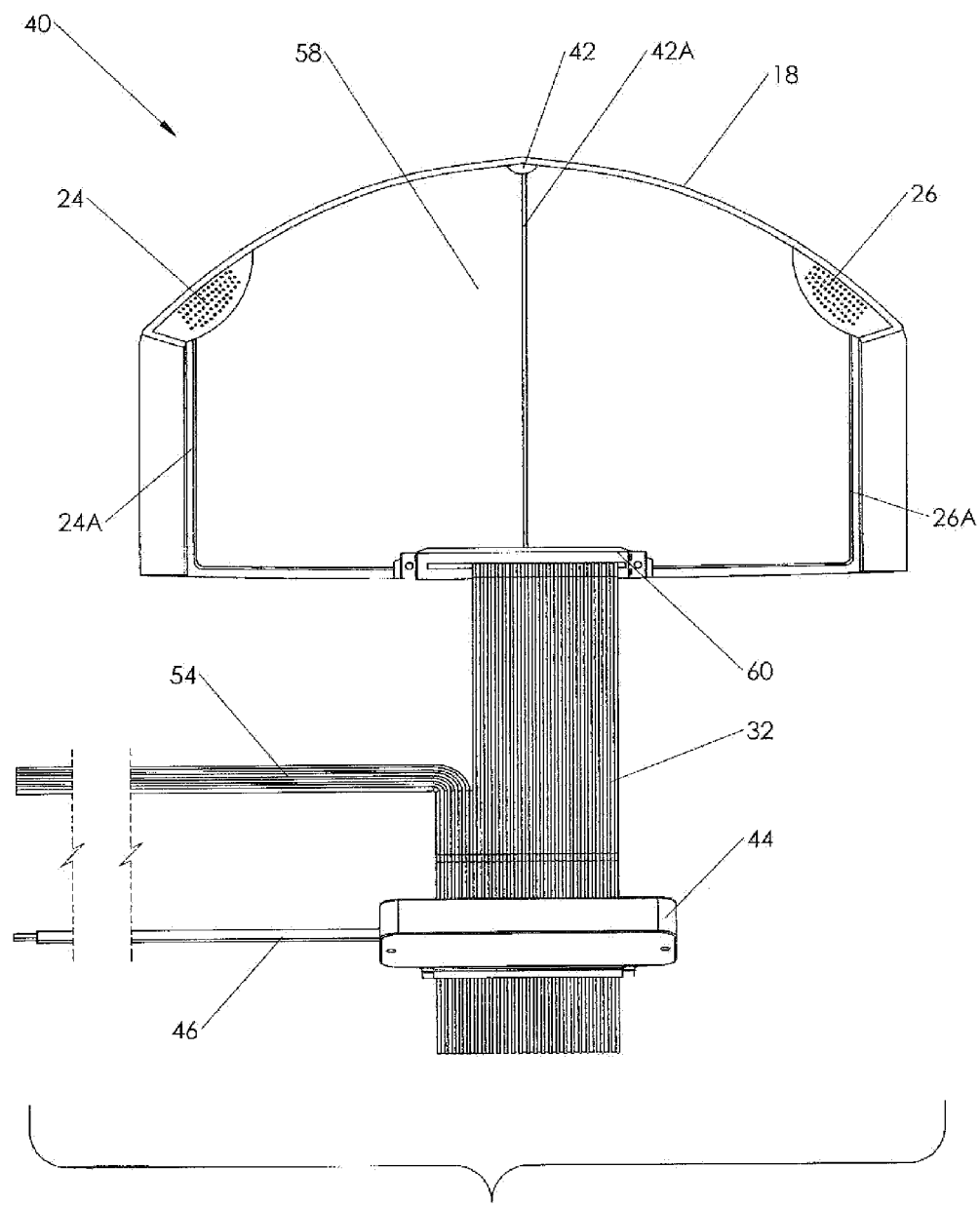
FIG. 5 is a schematic view of the entertainment system for a motorcycle of the present invention looking forwards towards the front end of the motorcycle.
Figure 6:
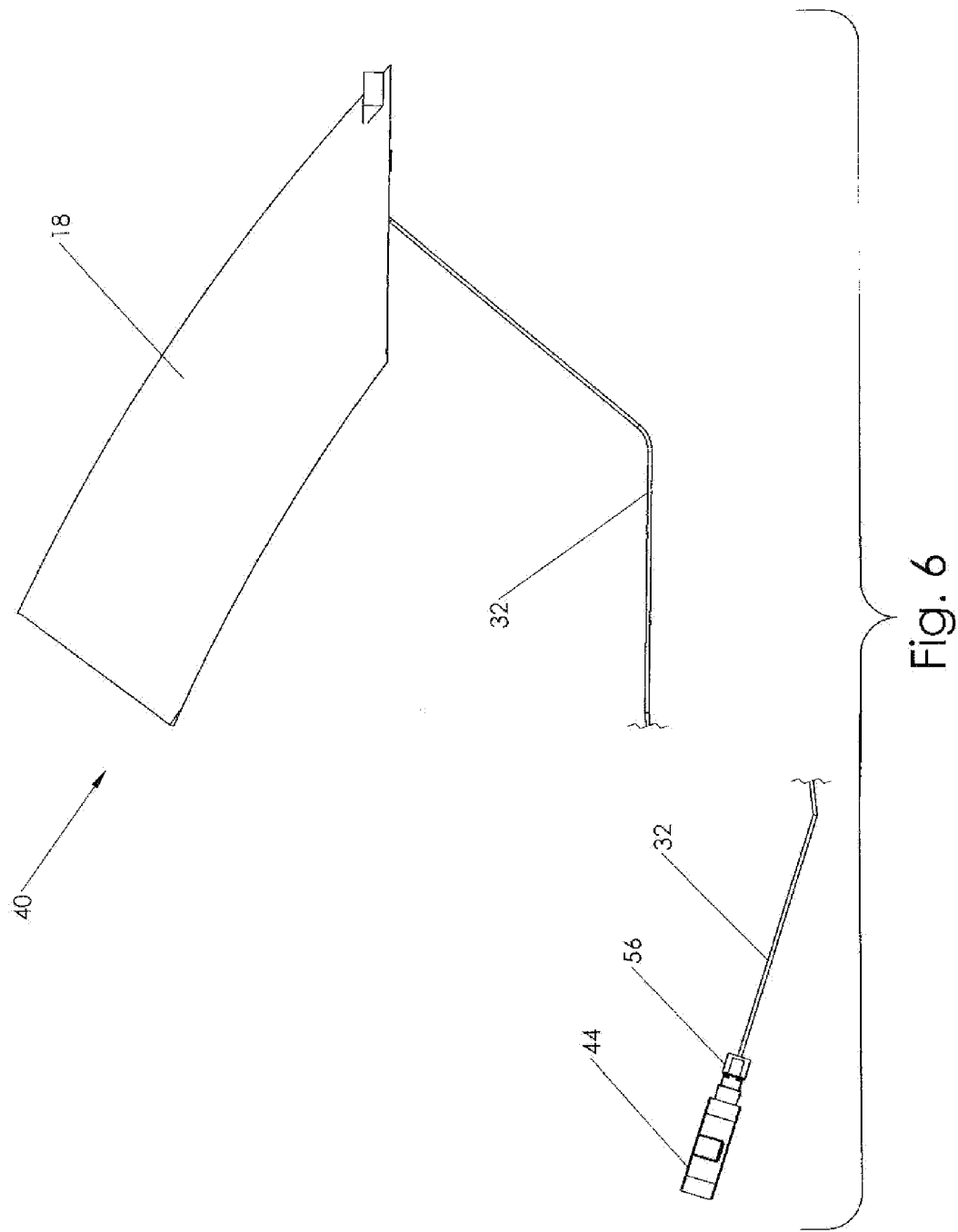
FIG. 6 is a schematic view of the entertainment system for a motorcycle looking towards a side of the motorcycle.

Referring to FIGS. 2, 3 and 5, control switches 28 mounted preferably to the left hand grip 30 are used to control power supplied to the speakers 24, 26, the video camera 42, and the video display screen. Volume control for the speakers and operation of a Bluetooth system are also controlled via the control switches 28. Conductors 54 extend between the control switches 28 and the conductive wire tape 32 as shown in a schematic in FIG. 5. Preferably the components of the entertainment system are waterproof.

Referring to FIG. 1, the wire tape 32 is shown in a hidden line extending from a lower portion of the windscreen 18 below the fuel tank 17, below the operator's seat 12 and into the compartment 16 located below the operator's seat 12 and passenger's seat 14. Inside the compartment 16 one end of the wire tape 32 is attached to a connector 56 that is in turn attached to the controller 44 as best shown in the schematic view of FIG. 4. Access to the hardware of the controller 44 can be facilitated by removing fasteners 50, 52 and lifting off the lid of the controller. The controller 44, and indeed the entire entertainment system receives power from the electrical system of the motorcycle via the wires 46, 46A one of which is a ground wire. The controller 44 may be provided with updates, movies, audio programs, and maintenance via a USB port 48. The controller may include circuitry for GPS tracking of the location of the motorcycle and sending an alarm signal in the event that the motorcycle is involved in a crash.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. An entertainment system for a motorcycle comprising: (a) a motorcycle windscreen provided with at least one speaker, a camera and a video display screen; (b) conductors connecting the speaker, camera and video display screen to a controller for conducting power and control signals between the controller and the speaker, camera and video display screen; and (c) control switches for sending control signals to the controller via conductors, images presented on the video display screen being visible only from a side of the windscreen that faces away from an operator of the motorcycle when the motorcycle is moving forward, the controller has circuitry for recording video images obtained by the camera and sending the recorded video images to the display screen, whereby the operator of the motorcycle can only view the images presented on the video display screen when the motorcycle is parked.

2. The entertainment system for a motorcycle according to claim 1 wherein the controller is provided with conductors for receiving power from an electrical system of a motorcycle and grounding the entertainment system.

3. The entertainment system for a motorcycle according to claim 1 further comprising a screen protector overlying the video display screen.

4. The entertainment system for a motorcycle according to claim 1 wherein the controller has Bluetooth circuitry allowing cell phone communication to the at least one speaker.

5. The entertainment system for a motorcycle according to claim 1 wherein the controller has circuitry for recording video images obtained by the camera and sending the recorded video images to the display screen.

6. The entertainment system for a motorcycle according to claim 1 wherein the controller has GPS circuitry for determining the location of the entertainment system and sending a distress signal if the entertainment system is installed on a motorcycle that has crashed.

7. The entertainment system for a motorcycle according to claim 4 wherein the controller has GPS circuitry for determining the location of the entertainment system and sending a distress signal if the entertainment system is installed on a motorcycle that has crashed.

8. The entertainment system for a motorcycle according to claim 5 wherein the controller has GPS circuitry for determining the location of the entertainment system and sending a distress signal if the entertainment system is installed on a motorcycle that has crashed.

* * * * *